Dec. 23, 1924. 1,520,529
L. J. CAGLE
LOPPING OR PRUNING SHEARS
Filed Feb. 3, 1923
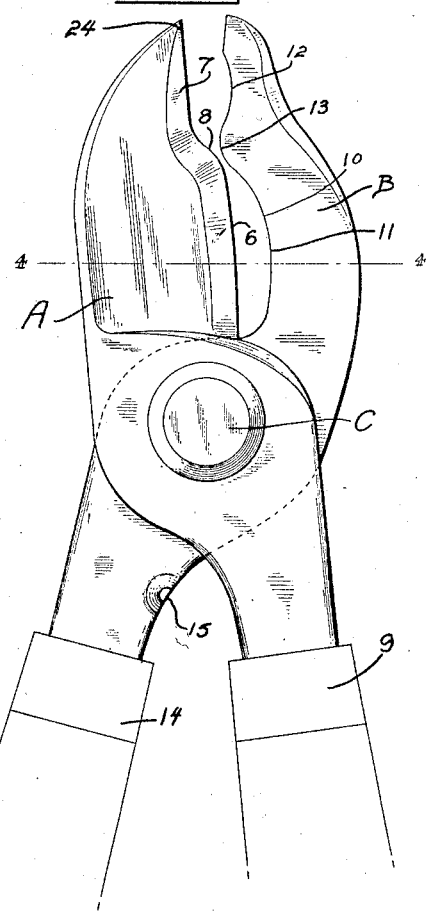
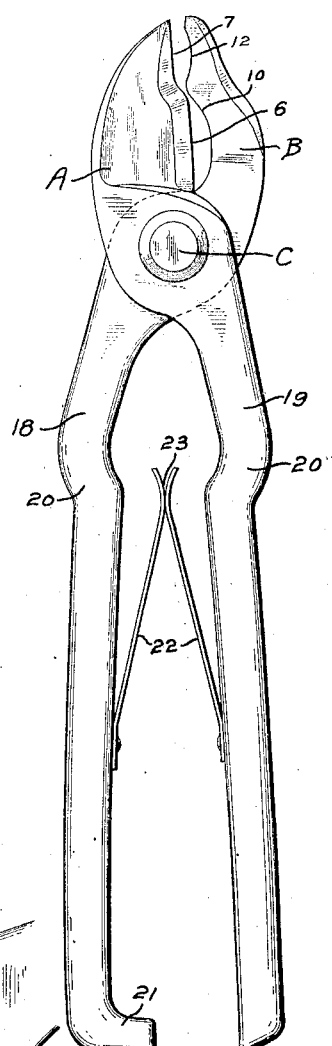
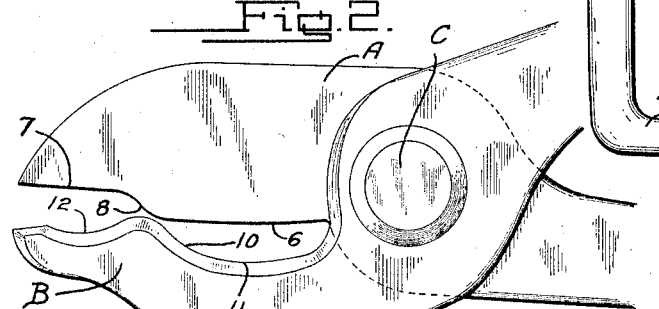
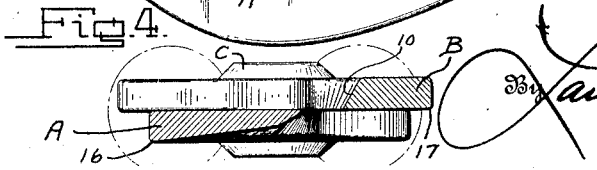
Inventor
Lester J. Cagle Patented Dec. 23, 1924.

1,520,529

UNITED STATES PATENT OFFICE.

LESTER J. CAGLE, OF WENATCHEE, WASHINGTON.

LOPPING OR PRUNING SHEARS.

Application filed February 3, 1923. Serial No. 616,741.

*To all whom it may concern:*

Be it known that I, LESTER J. CAGLE, a citizen of the United States, residing at Wenatchee, in the county of Chelan and State of Washington, have invented certain new and useful Improvements in Lopping or Pruning Shears, of which the following is a specification.

The present invention relates to pruning shears, such as are used to trim the limbs of trees or bushes.

The principal objects of the invention are to provide a pair of shears which are particularly adapted to grip the limb to be cut so that the shears cannot slide off the limb when pressure is applied to the handles; to so construct the blades that either small or large limbs may be cut; and to so shape the cutting portions that they may be readily sharpened by use of a flat file, emory wheel, or other abrasive element capable of sharpening a straight cutting edge.

Other objects and advantages of the invention will appear in the following detailed description, taken in connection with the accompanying drawings, forming a part of this specification, in which drawings:

Figure 1 is a front elevation of the blades of the shears.

Figure 2 is a rear elevation of the blades of the shears.

Figure 3 is an elevation of a pair of shears having a slightly modified handle structure.

Figure 4 is a sectional elevation, taken on the line 4—4 of Figure 1.

In the drawings, wherein similar reference characters refer to similar parts throughout the views, A designates the cutting blade of the shears, and B designates the holding blade of the shears. These two blades are pivoted upon a rivet or bolt or the like C. The blades A and B are formed of suitably tempered steel.

The cutting blade A has two cutting edges 6 and 7 respectively. The inner cutting edge 6 is relatively long and straight. The outer cutting edge 7 is relatively short and also straight and is somewhat offset from the cutting edge 6. The offset 8 may be also sharpened to form a cutting edge. The blade A has a handle or shank 9 by which that arm of the shears may be gripped.

The holding blade B has an edge 10 at its side opposite the cutting blade A. The edge 10 is shaped to form a relatively long arcuate concave portion 11 opposite to the relatively long cutting edge 6 and a relatively shallow concave portion 12 opposite the relatively short cutting edge 7 of the blade A. The rounded projection 13 is thus provided between the two concave portions 11 and 12, and this projection 13 is directly opposite the offset 8 of the cutting blade A. It will be noted that in the use of the shears when cutting the projection 13 will first contact with the offset 8 when the two blades are brought together. The holding blade B is provided with a shank or handle 14 and a stop 15 is provided on this handle as shown in Figure 1.

The cutting blade A is tapered down to a point at its outer end 24 and the holding blade B is of substantially the same thickness throughout its length. The blades A and B are pivoted in the usual manner by a rivet or bolt or the like C.

It will also be noted, in Figure 4 of the drawings, that the cutting blade A is tapered in cross section in such a manner that a practically straight line can be drawn from the outer corner 16 of the cutting blade A to the outer corner 17 of the holding blade B. This is for purposes hereinafter set forth.

In the structure shown in Figure 1, no springs are provided between the handles 9 and 14 of the blades and their movement toward each other is merely limited by the stop 15, as this form of shears is for use in lopping of larger boughs or limbs. In the modification shown in Figure 3, which is designed for pruning bushes, the handles 18 and 19 of the holding blade B and cutting blade A respectively, are offset as shown at 20. A projection 21 is provided on the inner side of the end of the handle 18 which is adapted to contact or abut against the inner side of the handle 19 to limit the movement of the blades toward each other. Flat springs 22 having one end fixed to the inner side of the handles 18 and 19 are provided between these handles. The free ends 23 of the springs 22 are adapted to contact to normally hold the blades of the shears open.

In the use of my improved shears, when it is desired to trim a limb, the cutting edge of the shears can be brought relatively close to the end of the limb owing to the flat surface between the points 16 and 17 of the blades A and B respectively. Thus, the limbs can be more skillfully trimmed. The shape of the blades A and B is such that they will not slide from about the limb when the handles are brought together, but, on the contrary they will grip the limbs the tighter. Thus, when the shears are placed about the limb or bough so that the bough is between the edges 6 and 11 and pressure is applied to the handles, the first point of the edges to contact will be the point or projection 13 with the opposite offset 8. This will naturally prevent the shear from then sliding from about the bough being cut, and the arcuate outline of the edge 11 is such that the more pressure is applied to the handle, the more the bough will be forced toward the rivet C of the shears. This will insure a good clean cut. Larger boughs or limbs can be placed between the cutting edge 6 and the holding edge 11 and smaller limbs may be placed between the cutting edge 7 and holding edge 12. The relatively smaller edges 7 and 12 will naturally make a better cut of smaller limbs and the arcuate shape of the edge 12 will force the limb toward the rivet C of the shears as in the case of the arcuate edge 11.

Because of the straight cutting edges 6 and 7, which are provided, these shears can be easily sharpened with a flat file and the taper of cutting blade A which is shown in Figure 4 aids in this process. The blades A and B can be opened, and a flat file may be easily passed across the cutting edges 6 and 7 and between the blades. Sharpening is therefore a much simpler process than in the case of the shears having a rounded cutting edge.

It is to be understood that the form of my invention shown and described, is to be taken as a preferred example of the same, and that various changes in the shape, size and arrangement of parts may be resorted to, without departing from the spirit of the invention or the scope of the subjoined claims.

I claim:

1. Pruning shears comprising a pair of pivoted blades, one being a cutting blade and the other a holding blade, said cutting blade having straight cutting edges positioned in offset relation to each other and the holding blade having inwardly curved gripping edges positioned in opposed relation to the straight cutting edges and having projections between the curved gripping edges contacting with the first blade between the straight cutting edges thereof prior to movement of the straight cutting edges into the recesses when the blades are moved toward each other.

2. Pruning shears comprising a cutting blade and a holding blade, said blades being pivoted together, said cutting blade having an inner relatively long straight cutting edge, and an outer and relatively short straight cutting edge, said short cutting edge being offset from said first named cutting edge, said holding blade having an inner and relatively concaved edge opposite said first named cutting edge, and an outer and relatively shallow concaved edge opposite said last named cutting edge, and a projection between said concaved portions adapted to contact with the offset of said cutting edge.

LESTER J. CAGLE.